United States Patent
Vig et al.

(10) Patent No.: US 11,968,619 B2
(45) Date of Patent: Apr. 23, 2024

(54) MINIMIZATION OF TWT-BASED CONTENTION IN MESH NETWORKS

(71) Applicant: MediaTek Singapore Pte. Ltd., Singapore (SG)

(72) Inventors: Prakhar Vig, Noida (IN); Amit Shakya, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 336 days.

(21) Appl. No.: 17/550,799

(22) Filed: Dec. 14, 2021

(65) Prior Publication Data
US 2022/0201604 A1 Jun. 23, 2022

(30) Foreign Application Priority Data
Dec. 17, 2020 (IN) ............................. 202021054961

(51) Int. Cl.
*H04W 52/02* (2009.01)
*H04W 56/00* (2009.01)
*H04W 84/18* (2009.01)

(52) U.S. Cl.
CPC ..... *H04W 52/0216* (2013.01); *H04W 56/001* (2013.01); *H04W 84/18* (2013.01)

(58) Field of Classification Search
CPC ............. H04W 52/0216; H04W 56/00; H04W 56/0015; H04W 16/24; Y02D 30/70
See application file for complete search history.

(56) References Cited

U.S. PATENT DOCUMENTS

| 2016/0128024 A1 | 5/2016 | Frederiks et al. | |
| 2019/0261269 A1* | 8/2019 | Choi | H04W 52/0206 |
| 2020/0359327 A1* | 11/2020 | Bhanage | H04W 52/0235 |

OTHER PUBLICATIONS

Taiwan Intellectual Property Office, Office Action for Taiwan Patent Application No. 110147157, Aug. 8, 2022.

* cited by examiner

*Primary Examiner* — Ayanah S George
(74) *Attorney, Agent, or Firm* — Han IP PLLC; Andy M. Han

(57) ABSTRACT

Various schemes pertaining to minimization of target wakeup time (TWT)-based contention in mesh networks are described. An apparatus functioning as an agent collates TWT durations requested by a plurality of stations (STAs) to generate a total TWT duration. The apparatus transmits information of the total TWT duration to a controller. In response to the transmitting, the apparatus receives receiving an allocation of a slot from the controller. The apparatus then causes the plurality of STAs to contend for access to a medium during the slot.

20 Claims, 6 Drawing Sheets

MINIMIZATION OF TWT-BASED CONTENTION IN MESH NETWORKS

CROSS REFERENCE TO RELATED PATENT APPLICATION(S)

The present disclosure claims the priority benefit of India Patent Application No. 202021054961, filed 17 Dec. 2020, the content of which being incorporated by reference in its entirety.

TECHNICAL FIELD

The present disclosure is generally related to computer networking and, more particularly, to minimization of target wakeup time (TWT)-based contention in mesh networks.

BACKGROUND

Unless otherwise indicated herein, approaches described in this section are not prior art to the claims listed below and are not admitted to be prior art by inclusion in this section.

In a mesh network, such as one implementing one or more of Institute of Electrical and Electronics Engineers (IEEE) 802.11 standards, a TWT allows a controller to manage activities in a basic service set (BSS) by scheduling mesh devices in the mesh network to serve their connected stations (STAs), such as IEEE 802.11ax STAs, at different times in order to minimize contention between those IEEE 802.11ax STAs. When the radios of multiple agents are on the same channel, each radio can have multiple STAs connected thereto. Each agent can manage TWTs for those STAs connected to it. However, STAs across agents can still contend for medium simultaneously as they are not aware of the TWTs of other devices (e.g., other STAs connected to other agents in the mesh network). This would negatively impact overall performance in the mesh network. Therefore, there is a need for a solution that minimizes TWT-based contention in mesh networks.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes to minimize TWT-based contention in mesh networks. It is believed that implementation of various proposed schemes of the present disclosure may reduce or otherwise minimize contention between STAs connected across different agents in a mesh network, thereby improving overall mesh network performance. Moreover, it is also believed that implementation of various proposed schemes of the present disclosure may avoid unnecessary early STA wakeup, thereby improving device power efficiency.

In one aspect, a method may involve an agent collating TWT durations requested by a plurality of STAs to generate a total TWT duration. The method may also involve the agent transmitting information of the total TWT duration to a controller. The method may further involve the agent receiving an allocation of a slot from the controller responsive to the transmitting. The method may additionally involve the agent causing the plurality of STAs to contend for access to a medium during the slot.

In another aspect, a method may involve a controller receiving information of total TWT durations from a plurality of agents, with each of the total TWT durations being collated by a respective agent of the plurality of agents based on TWT durations requested by a respective plurality of STAs connected to the respective agent. The method may also involve the controller allocating a plurality of slots to the plurality of agents based on the received information. The method may further involve the controller transmitting an allocation of a respective slot of the plurality of slots to each agent of the plurality of agents such that each agent causes its respective plurality of STAs to contend for access to a medium during the respective slot.

In yet another aspect, an apparatus may include a transceiver and a processor. The transceiver may be configured to communicate wirelessly. The processor may perform operations via the transceiver, including: (a) collating TWT durations requested by a plurality of STAs to generate a total TWT duration; (b) transmitting information of the total TWT duration to a controller; (c) receiving an allocation of a slot from the controller responsive to the transmitting; and (d) causing the plurality of STAs to contend for access to a medium during the slot.

It is noteworthy that, although description provided herein may be in the context of certain radio access technologies, networks and network topologies such as Wi-Fi and mesh networks, the proposed concepts, schemes and any variation(s)/derivative(s) thereof may be implemented in, for and by other types of radio access technologies, networks and network topologies such as, for example and without limitation, repeater networks, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to minimization of TWT-based contention in mesh networks. According to the present disclosure, a number of possible solutions may be implemented separately or jointly. That is, although these possible solutions may be described below separately, two or more of these possible solutions may be implemented in one combination or another.

Figure 1:
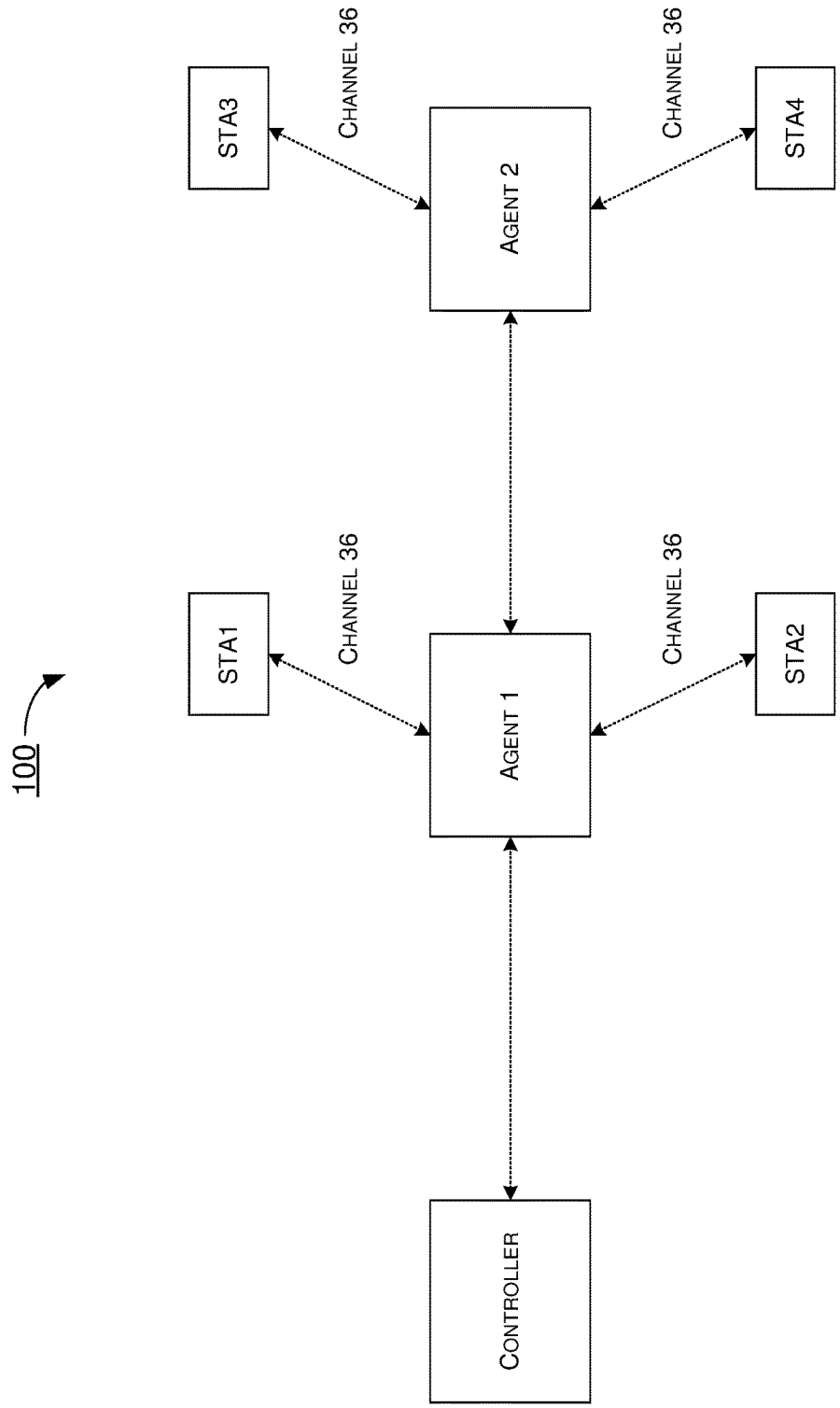
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

It is noteworthy that, in the present disclosure, the term "agent" refers to an entity or device which is part of a mesh network controlled by a controller and supports the functionality of an access point (AP) STA or non-AP STA. Moreover, the term "controller" refers to a centralized entity or device which controls the devices (e.g., agents) present in the mesh network. In some implementations, an AP STA may function as a controller while one or more other AP STA(s) may function as one or more agent(s).

Referring to FIG. 1, network environment 100 may involve a wireless network (e.g., a mesh network, a repeater network or a certain type of wireless local area network (WLAN)) having a controller, a plurality of agents and a plurality of STAs. For illustrative purposes and simplicity, two agents (e.g., Agent 1 and Agent 2) each with two associated STAs (e.g., STA1 and STA2 associated with Agent 1 and STA3 and STA4 associated with Agent 2) are shown in FIG. 1, although different numbers of agents and STAs may be present in various implementations. Under various proposed schemes in accordance with the present disclosure, each of the controller, Agent 1, Agent 2, and STA1 STA4 may be configured to perform respective aspects of minimization of TWT-based contention in mesh networks in accordance with various proposed schemes described below.

Under a proposed scheme in accordance with the present disclosure, a TWT corresponding to a STA in a mesh network (e.g., wireless network 120) may be managed by a centralized entity such as a controller. The controller may first configure agents in the mesh network to a clean channel (e.g., channel 36 as shown in FIG. 1 although a different channel may be chosen in various implementations) so that all agents may operate on the same clean channel. This may simplify control by the controller compared to a case in which multiple agents are assigned to separate channels where some of those agents might encounter external overlapping BSS (OBSS) traffic (e.g., interference). Under the proposed scheme, each STA connected to a given agent in the mesh network may request the agent to provide a TWT duration for the STA. Correspondingly, the agent may collate the requested TWT durations to cumulate a total TWT wake duration of all connected STAs (e.g., IEEE 802.11ax STAs) and provide information of the total TWT wake duration to the controller. That is, all agents in the mesh network may share information of the TWTs of their associated STAs to the controller. The controller, as a centralized entity, may determine a wake duration for each agent such that only one agent (and its associated one or more STAs connected thereto) may access a medium at any given time (e.g., the allocated time for that agent and its associated STAs). Afterwards, the controller may provide a response to each agent with slot information and a cumulative wake duration.

Under a proposed scheme in accordance with the present disclosure, a timing synchronization function (TSF) may be synchronized among the controller and all agents so that the entire mesh network follows the same TSF. Once the TSF is synchronized, the controller may reference a TWT start time (e.g., the TWT start time for each agent as indicated in an allocation of its respective slot) using a target beacon transmission time (TBTT) or some other offset. The controller may allocate a respective slot to each agent for its total wake duration such that no two slots of different agents would collide and that repetition of intervals of different agents would be different without overlap.

Under a proposed scheme in accordance with the present disclosure, there may be two approaches for an agent to undertake to help improve network efficiency. In a first approach under the proposed scheme, the agent may request all the STAs connected to the agent to remain in a wakeup mode or state for a complete total wake duration as indicated by the controller, such that the STAs contend for access to the medium for the entire duration of the slot. However, this option might increase the wakeup time of the STAs and, thus, may increase power consumption on the part of the STAs.

Figure 2:
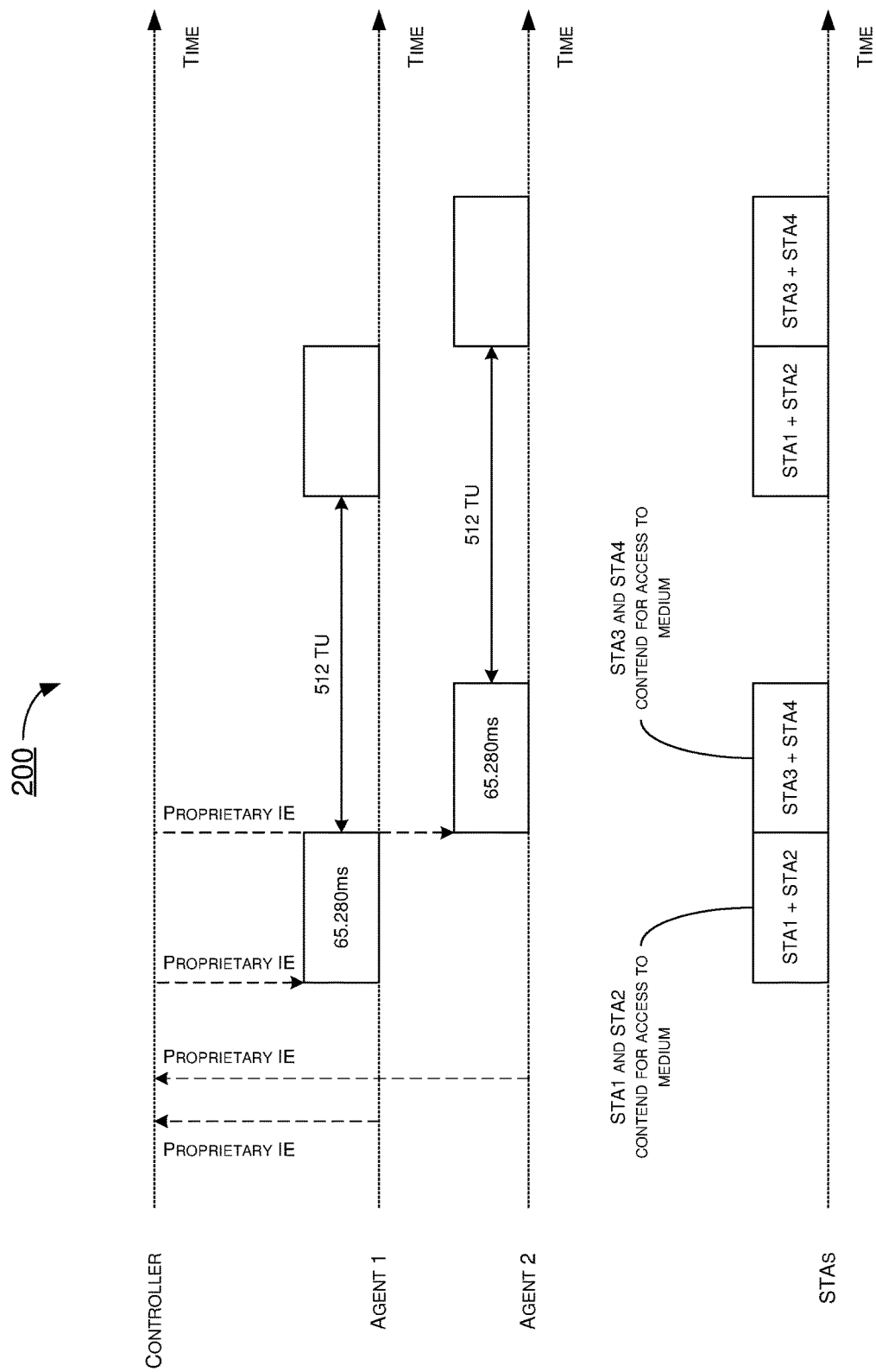
FIG. 2 is a diagram of an example scenario in accordance with the present disclosure.

FIG. 2 illustrates an example scenario 200 under the first option. In scenario 200, initially, each of Agent 1 and Agent 2 may receive and collate requested TWT durations to cumulate a total TWT wake duration of its respective connected STAs. Then, each of Agent 1 and Agent 2 may share information of the TWTs of their associated STAs to the controller (e.g., via a proprietary information element (IE)). Afterwards, the controller may provide a response to each agent (e.g., via a proprietary IE) with slot information and a cumulative wake duration. Specifically, the controller may provide a first response to Agent 1 prior to or at the beginning of a first slot and then provide a second response to Agent 2 prior to or at the beginning of a second slot after the first slot, as shown in FIG. 2. In the first slot, Agent 1 may wake up its connected STAs, namely STA1 and STA2, for the entire duration of the first slot, so that STA1 and STA2 may contend for access to the medium during the first slot. Similarly, in the second slot, Agent 2 may wake up its connected STAs, namely STA3 and STA4, for the entire duration of the second slot, so that STA3 and STA4 may contend for access to the medium during the second slot.

In a second approach under the proposed scheme, the agent may distribute the wake durations allocated by the controller to all the STAs connected to the agent based on their requested TWT duration. For instance, the portion of the slot distributed or otherwise assigned to a given STA may correspond to (e.g., be proportional to) the requested TWT duration of that STA in the total TWT duration requested by all the STAs connected to the agent (e.g., STA1 and STA2 may be distributed 40% and 60% of the first slot, respectively, in case the requested TWT duration of STA2 is 1.5 times that requested by STA1). The STAs may wake up one by one, each at its own time, and contend for the access to the medium during a respective portion of the slot. As such, this may be a more power-efficient approach.

Figure 3:
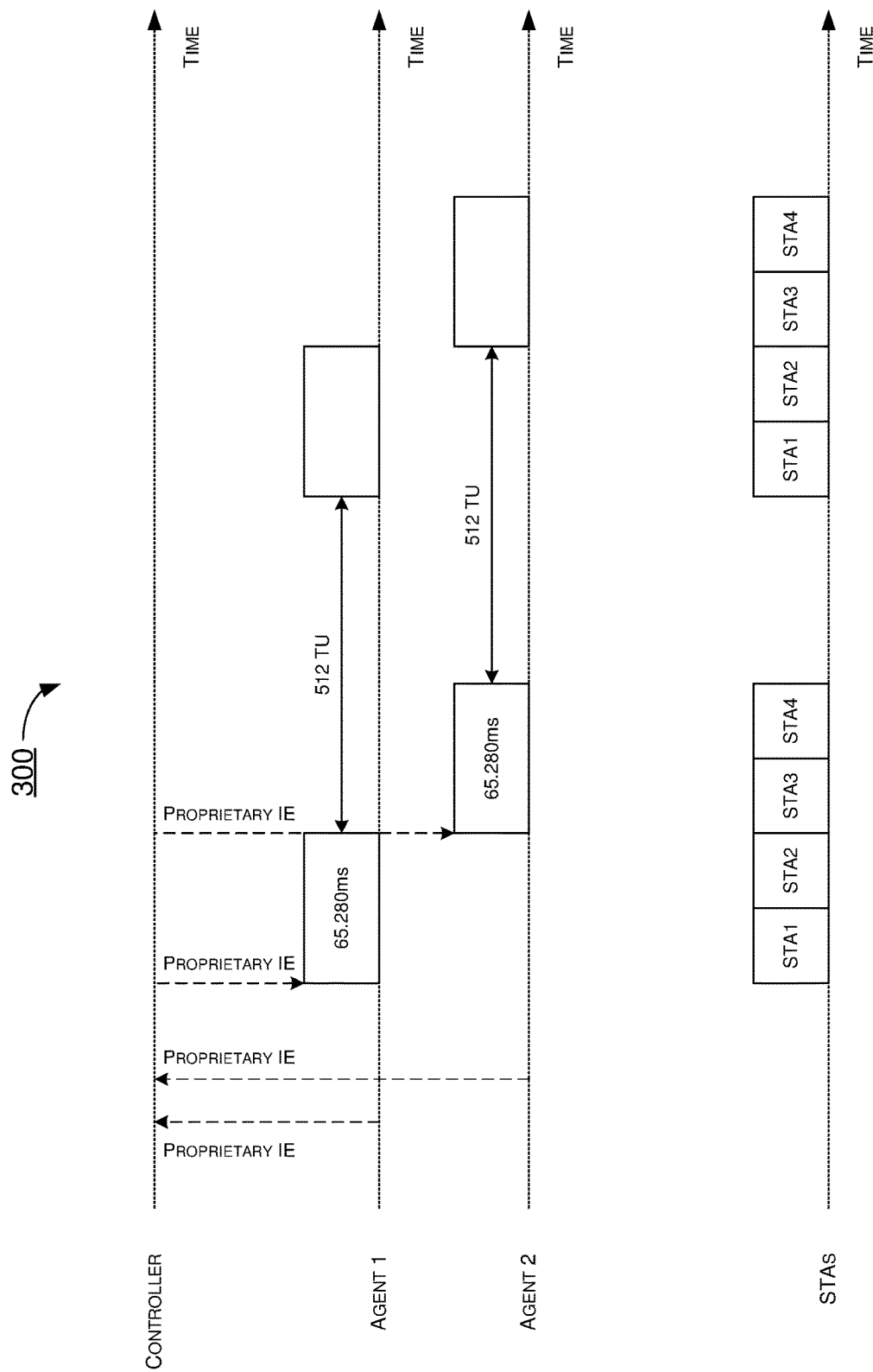
FIG. 3 is a diagram of an example scenario in accordance with the present disclosure.

FIG. 3 illustrates an example scenario 300 under the second option. In scenario 300, initially, each of Agent 1 and Agent 2 may receive and collate requested TWT durations to cumulate a total TWT wake duration of its respective connected STAs. Then, each of Agent 1 and Agent 2 may share information of the TWTs of their associated STAs to the controller (e.g., via a proprietary IE). Afterwards, the controller may provide a response to each agent (e.g., via a proprietary IE) with slot information and a cumulative wake duration. Specifically, the controller may provide a first response to Agent 1 prior to or at the beginning of a first slot and then provide a second response to Agent 2 prior to or at the beginning of a second slot after the first slot, as shown in FIG. 3. In the first slot, Agent 1 may wake up its connected STAs, namely STA1 and STA2, one at a time, so that each of STA1 and STA2 may itself contend for access to the medium during a respective portion of the first slot. Similarly, in the second slot, Agent 2 may wake up its connected STAs, namely STA3 and STA4, one at a time, so that each of STA3 and STA4 may itself contend for access to the medium during a respective portion of the second slot.

In view of the above, it may be seen that certain advantages or benefits may be achieved by implementation of the proposed schemes. For instance, as the controller makes centralized decisions based on TWT durations of STAs connected across the agents in the mesh network, contention between STAs connected across different agents in the mesh network may be reduced or otherwise minimized, thereby helping improve overall system performance of the mesh network. Moreover, the controller may provide slots accordingly and align wakeup times of STAs so as to avoid unnecessary early STA wakeup. As such, STAs may stay in a sleep mode or low-power mode for a longer duration, thereby improving device power efficiency.

It is noteworthy that, with respect to TSF synchronization among a controller and corresponding agents, there may be more than one approach which may be utilized in various implementations of the proposed schemes. In a first approach, an agent may APCLI/backhaul a STA which is directly connected to the controller may synchronize its TSF from a controller beacon. Then, the agent may update its corresponding access point (AP) with controller-synchronized TSF and start advertising a new TSF in its beacon. At this point, each of the corresponding agents which are connected to the controller-synchronized agent may update their TSF and its corresponding AP. This way, the entire mesh network may synchronize its TSF based on the controller's TSF.

As an example of the first approach, in a daisy chain approach, Agent 1 may be connected to the controller and Agent 2 may be connected to Agent 1. Initially, Agent 1 APCLI may have its TSF synchronized to the controller, then the AP corresponding to Agent 1 may update its TSF in its beacon with the value which Agent 1 APCLI synchronized from the controller (e.g., now Agent 1 AP beacon has TSF synchronized as per controller). In response to receiving the beacon from the AP corresponding to Agent 1, Agent 2 may synchronize its own TSF and update its AP TSF with the value its APCLI synchronized from the beacon from Agent 1. This way, all devices in the mesh network may be synchronized with the controller.

In a second approach, agents in the mesh network may periodically synchronize their TSFs with the controller. Once synchronized, each agent may update in its beacon that its TSF is synchronized. Then, when any non-synchronized agent listens to the beacon of a synchronized agent may synchronize its TSF using the synchronized beacon. This way, all devices in the mesh network may be synchronized with the controller.

Illustrative Implementations

Figure 4:
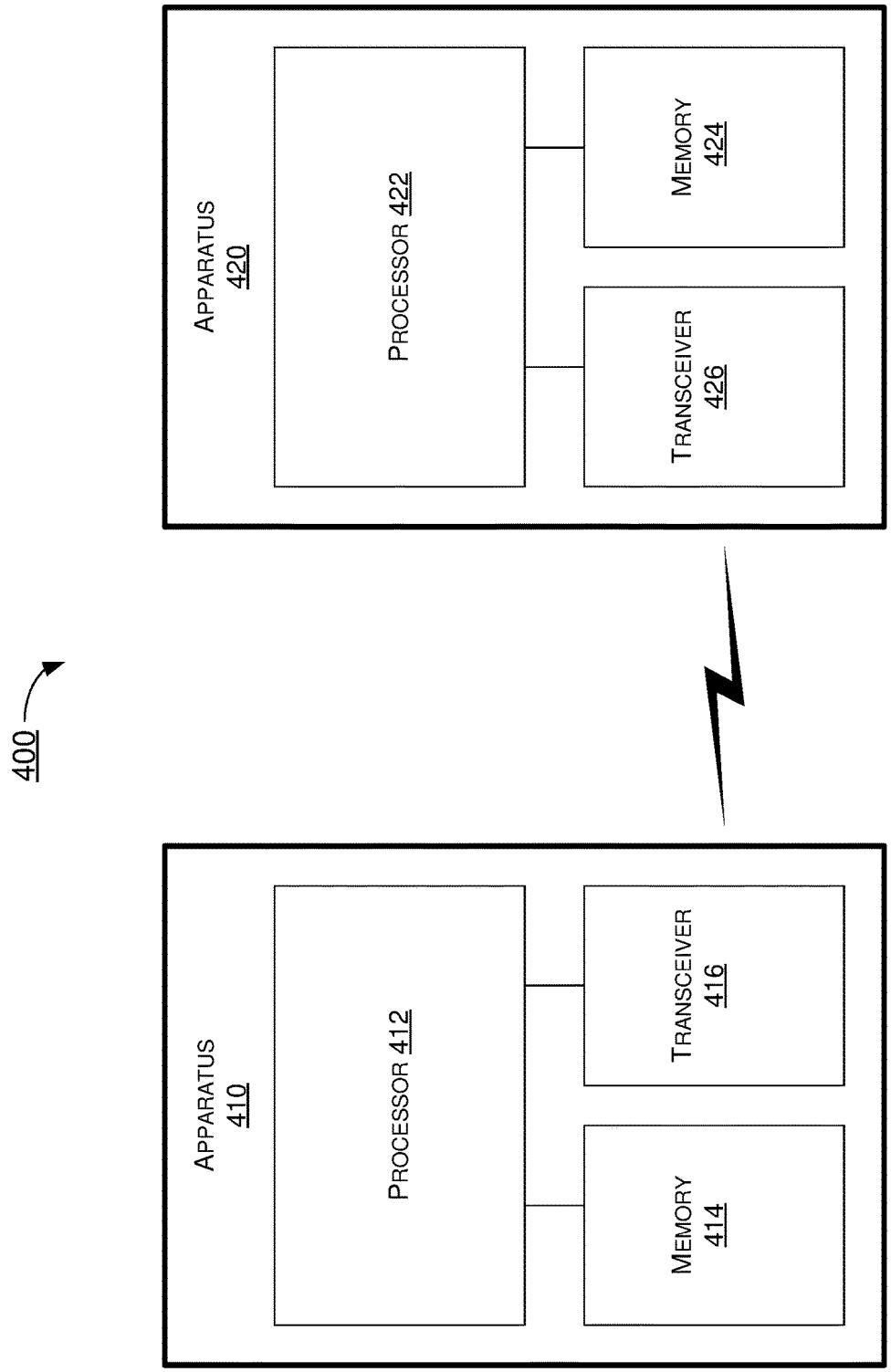
FIG. 4 is a block diagram of an example communication system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to minimization of TWT-based contention in mesh networks, including the various schemes described above with respect to various proposed designs, concepts, schemes, systems and methods described above as well as processes described below. For instance, apparatus 410 may be implemented in STA 110 and apparatus 420 may be implemented in STA 120, or vice versa.

Each of apparatus 410 and apparatus 420 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in a network node, such as an AP in a WLAN.

In some implementations, each of apparatus 410 and apparatus 420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 410 and apparatus 420 may be implemented in or as a non-AP STA or an AP STA. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, one or more RISC processors or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to minimization of TWT-based contention in mesh networks in accordance with various implementations of the present disclosure.

In some implementations, apparatus 410 may also include a transceiver 416 coupled to processor 412. Transceiver 416 may include a transmitter capable of wirelessly transmitting and a receiver capable of wirelessly receiving data. In some implementations, apparatus 420 may also include a transceiver 426 coupled to processor 422. Transceiver 426 may include a transmitter capable of wirelessly transmitting and a receiver capable of wirelessly receiving data.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410 and apparatus 420 is provided below in the context of apparatus 410 implemented in or as an agent (e.g., Agent 1 or Agent 2) and apparatus 420 implemented in or as a controller of a mesh network such as a WLAN in network environment 100 in accordance with one or more of IEEE 802.11 standards. It is noteworthy that, although the example implementations described below are provided in the context of WLAN, the same may be implemented in other types of networks.

Under a proposed scheme pertaining to minimization of TWT-based contention in mesh networks in accordance with the present disclosure, with apparatus 410 implemented in or as an agent and apparatus 420 implemented in or as the controller in network environment 100 in accordance with one or more of IEEE 802.11 standards, processor 412 of apparatus 410 may collate, via transceiver 416, TWT durations requested by a plurality of STAs to generate a total TWT duration. Additionally, processor 412 may transmit, via transceiver 416, information of the total TWT duration to apparatus 420. Moreover, processor 412 may receive, via transceiver 416, an allocation of a slot from apparatus 420 in response to transmitting the information of the total TWT duration to apparatus 420. Furthermore, processor 412 may cause, via transceiver 416, the plurality of STAs to contend for access to a medium during the slot.

In some implementations, in causing the plurality of STAs to contend for the access to the medium during the slot, processor 412 may keep the plurality of STAs in a wakeup mode during the slot such that the plurality of STAs contend for the access to the medium for a duration of the slot.

Alternatively, in causing the plurality of STAs to contend for the access to the medium during the slot, processor 412 may wake up each STA of the plurality of STAs one at a time such that each of the STAs contends for the access to the medium during a respective portion of the slot. In some implementations, in waking up each STA of the plurality of STAs one at a time, processor 412 may distribute a respective portion of the slot to each STA corresponding to a respective TWT duration requested by that STA.

In some implementations, processor 412 may also synchronize, via transceiver 416, a TSF with apparatus 420. In some implementations, a TWT start time indicated in the allocation of the slot may be referenced using a TBTT or an offset.

In some implementations, processor 412 may receive, via transceiver 416, a configuration from apparatus 420 which assigns a channel (e.g., a clean channel) on which to operate so that the plurality of STAs contend for the access to the medium on the channel during the slot.

Under a proposed scheme pertaining to minimization of TWT-based contention in mesh networks in accordance with the present disclosure, with apparatus 410 implemented in or as an agent and apparatus 420 implemented in or as the controller in network environment 100 in accordance with one or more of IEEE 802.11 standards, processor 422 of apparatus 420 may receive, via transceiver 426, information of total TWT durations from a plurality of agents including apparatus 410. Each of the total TWT durations may be collated by a respective agent of the plurality of agents based on TWT durations requested by a respective plurality of STAs connected to the respective agent. Additionally, processor 422 may allocate, via transceiver 426, a plurality of slots to the plurality of agents based on the received information. Moreover, processor 422 may transmit, via transceiver 426, an allocation of a respective slot of the plurality of slots to each agent of the plurality of agents such that each agent causes its respective plurality of STAs to contend for access to a medium during the respective slot.

In some implementations, the respective plurality of STAs may be kept in a wakeup mode during the respective slot such that the respective plurality of STAs contend for the access to the medium for a duration of the slot.

Alternatively, the respective plurality of STAs may be waken up one at a time such that each STA of the respective plurality of STAs contends for the access to the medium during a respective portion of the respective slot. In some implementations, each STA of the respective plurality of STAs may be assigned the respective portion of the respective slot corresponding to a respective TWT duration requested by that STA.

In some implementations, processor 422 may also synchronize, via transceiver 426, a TSF with the plurality of agents. In some implementations, a TWT start time indicated in the allocation may be referenced using a TBTT or an offset.

In some implementations, processor 422 may transmit, via transceiver 426, a configuration to each agent of the plurality of agents to assign a channel on which the plurality of agents operate so that the respective plurality of STAs of each agent contend for the access to the medium on the channel during the respective slot.

Illustrative Processes

Figure 5:
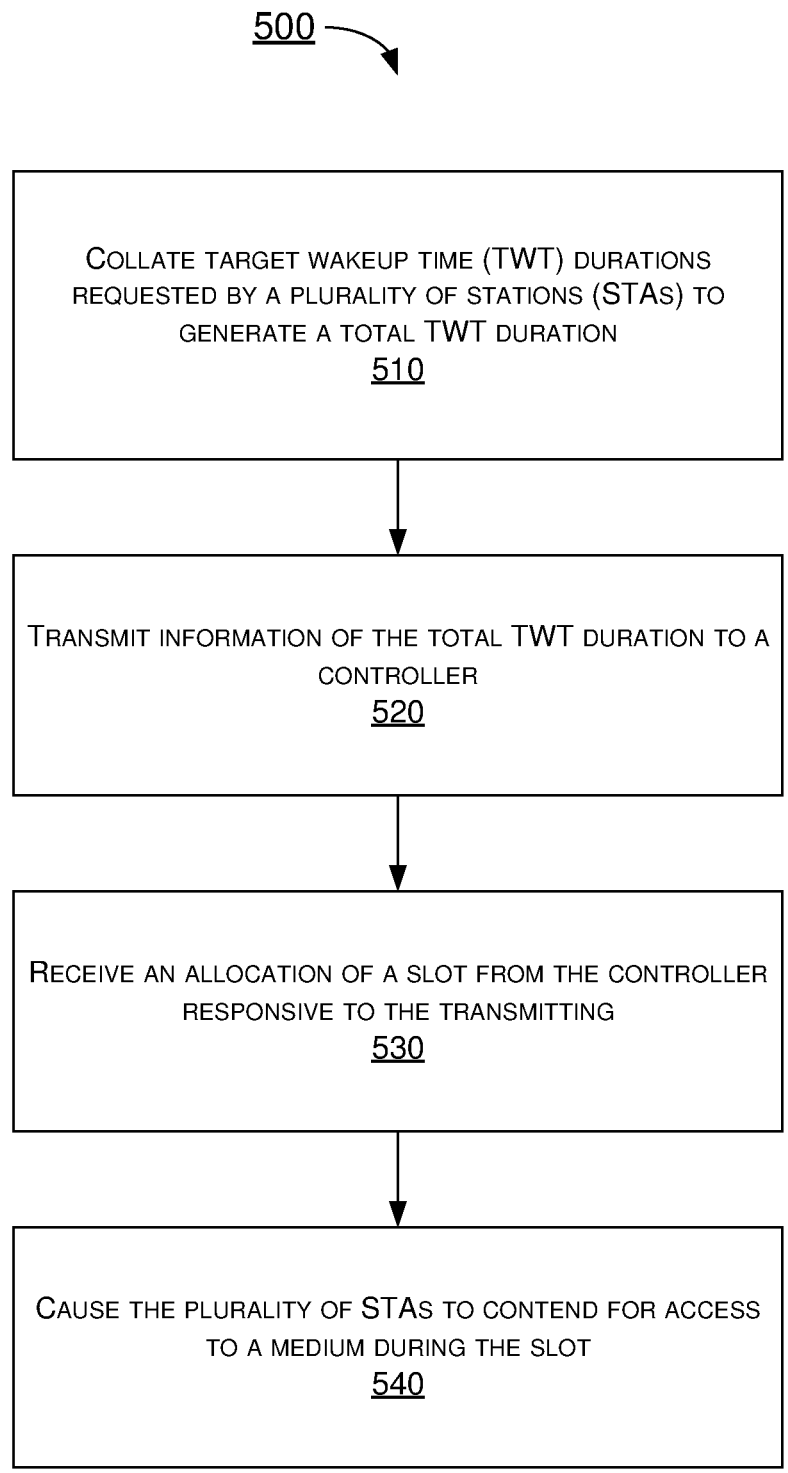
FIG. 5 is a flowchart of an example process in accordance with an implementation of the present disclosure.

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to minimization of TWT-based contention in mesh networks in accordance with the present disclosure. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. Furthermore, one or more of the blocks/sub-blocks of process 500 may be executed repeatedly or iteratively. Process 500 may be implemented by or in apparatus 410 and apparatus 420 as well as any variations thereof. Solely for illustrative purposes and without limiting the scope, process 500 is described below in the context of apparatus 410 implemented in or as an agent (e.g., Agent 1 or Agent 2) and apparatus 420 implemented in or as a controller of a mesh network such as a WLAN in network environment 100 in accordance with one or more of IEEE 802.11 standards. Process 500 may begin at block 510.

At 510, process 500 may involve processor 412 of apparatus 410 collating, via transceiver 416, TWT durations requested by a plurality of STAs to generate a total TWT duration. Process 500 may proceed from 510 to 520.

At 520, process 500 may involve processor 412 transmitting, via transceiver 416, information of the total TWT duration to apparatus 420. Process 500 may proceed from 520 to 530.

At 530, process 500 may involve processor 412 receiving, via transceiver 416, an allocation of a slot from apparatus 420 in response to transmitting the information of the total TWT duration to apparatus 420. Process 500 may proceed from 530 to 540.

At 540, process 500 may involve processor 412 causing, via transceiver 416, the plurality of STAs to contend for access to a medium during the slot.

In some implementations, in causing the plurality of STAs to contend for the access to the medium during the slot, process 500 may involve processor 412 keeping the plurality of STAs in a wakeup mode during the slot such that the plurality of STAs contend for the access to the medium for a duration of the slot.

Alternatively, in causing the plurality of STAs to contend for the access to the medium during the slot, process 500 may involve processor 412 waking up each STA of the plurality of STAs one at a time such that each of the STAs contends for the access to the medium during a respective portion of the slot. In some implementations, in waking up each STA of the plurality of STAs one at a time, process 500 may involve processor 412 distributing a respective portion of the slot to each STA corresponding to a respective TWT duration requested by that STA.

In some implementations, process 500 may additionally involve processor 412 synchronizing, via transceiver 416, a TSF with apparatus 420. In some implementations, a TWT start time indicated in the allocation of the slot may be referenced using a TBTT or an offset.

In some implementations, process 500 may further involve processor 412 receiving, via transceiver 416, a configuration from apparatus 420 which assigns a channel (e.g., a clean channel) on which to operate so that the plurality of STAs contend for the access to the medium on the channel during the slot.

Figure 6:
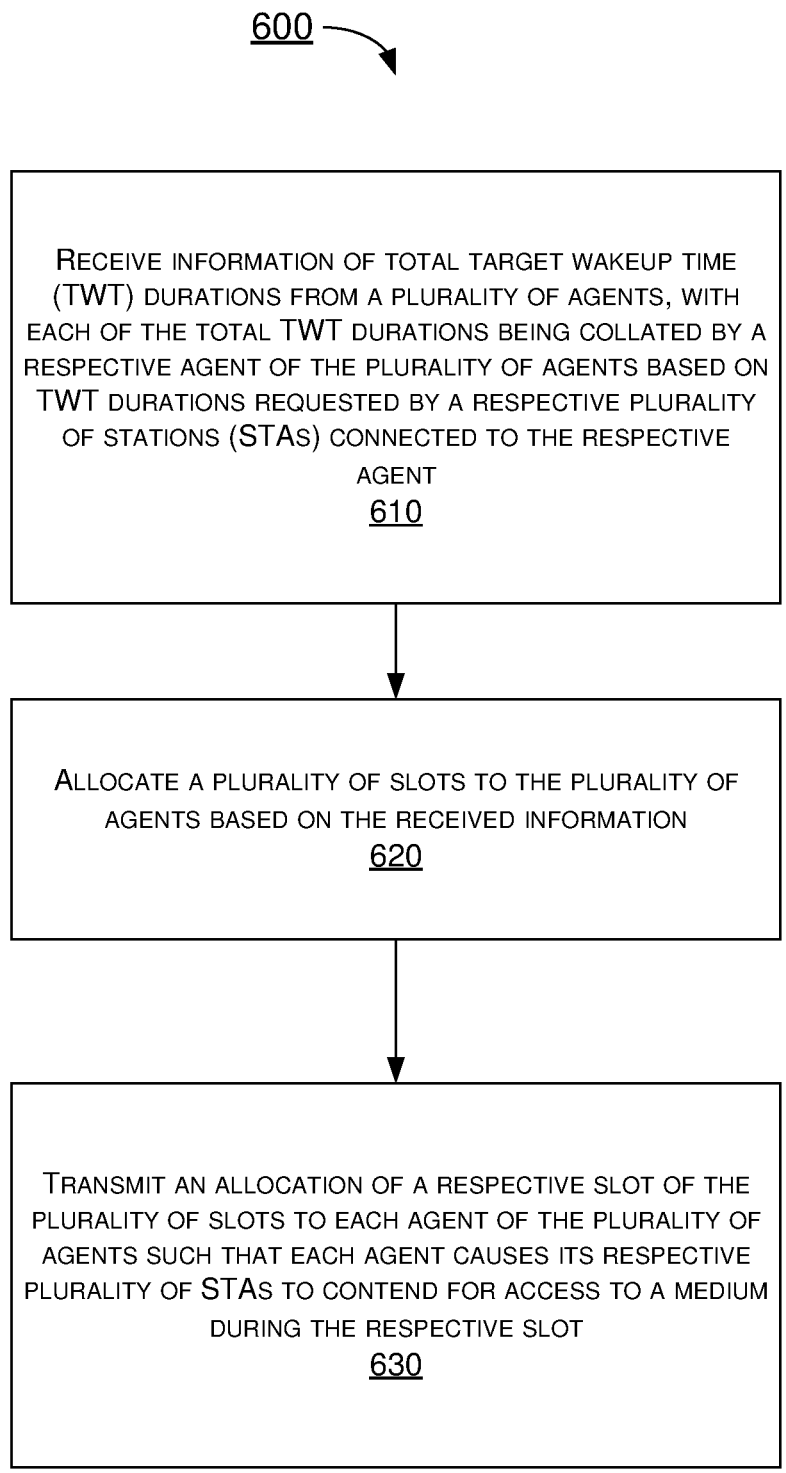
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to minimization of TWT-based contention in mesh networks in accordance with the present disclosure. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 410 and apparatus 420 as well as any variations thereof. Solely for illustrative purposes and without limiting the scope, process 600 is described below in the context of apparatus 410 implemented in or as an agent (e.g., Agent 1 or Agent 2) and apparatus 420 implemented in or as a controller of a mesh network such as a WLAN in network environment 100 in accordance with one or more of IEEE 802.11 standards. Process 600 may begin at block 610.

At 610, process 600 may involve processor 422 of apparatus 420 receiving, via transceiver 426, information of total TWT durations from a plurality of agents including apparatus 410. Each of the total TWT durations may be collated by a respective agent of the plurality of agents based on TWT durations requested by a respective plurality of STAs connected to the respective agent. Process 600 may proceed from 610 to 620.

At 620, process 600 may involve processor 422 allocating, via transceiver 426, a plurality of slots to the plurality of agents based on the received information. Process 600 may proceed from 620 to 630.

At 630, process 600 may involve processor 422 transmitting, via transceiver 426, an allocation of a respective slot of the plurality of slots to each agent of the plurality of agents such that each agent causes its respective plurality of STAs to contend for access to a medium during the respective slot.

In some implementations, the respective plurality of STAs may be kept in a wakeup mode during the respective slot such that the respective plurality of STAs contend for the access to the medium for a duration of the slot.

Alternatively, the respective plurality of STAs may be waken up one at a time such that each STA of the respective plurality of STAs contends for the access to the medium during a respective portion of the respective slot. In some implementations, each STA of the respective plurality of STAs may be assigned the respective portion of the respective slot corresponding to a respective TWT duration requested by that STA.

In some implementations, process 600 may additionally involve processor 422 synchronizing, via transceiver 426, a TSF with the plurality of agents. In some implementations, a TWT start time indicated in the allocation may be referenced using a TBTT or an offset.

In some implementations, process 600 may further involve processor 422 transmitting, via transceiver 426, a configuration to each agent of the plurality of agents to assign a channel on which the plurality of agents operate so that the respective plurality of STAs of each agent contend for the access to the medium on the channel during the respective slot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an", e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    collating target wakeup time (TWT) durations requested by a plurality of stations (STAs) to generate a total TWT duration;
    transmitting information of the total TWT duration to a controller;
    receiving an allocation of a slot from the controller responsive to the transmitting; and
    causing the plurality of STAs to contend for access to a medium during the slot.

2. The method of claim 1, wherein the causing of the plurality of STAs to contend for the access to the medium during the slot comprises keeping the plurality of STAs in a wakeup mode during the slot such that the plurality of STAs contend for the access to the medium for a duration of the slot.

3. The method of claim 1, wherein the causing of the plurality of STAs to contend for the access to the medium during the slot comprises waking up each STA of the plurality of STAs one at a time such that each of the STAs contends for the access to the medium during a respective portion of the slot.

4. The method of claim 3, wherein the waking up of each STA of the plurality of STAs one at a time comprises distributing a respective portion of the slot to each STA corresponding to a respective TWT duration requested by that STA.

5. The method of claim 1, further comprising:
synchronizing a timing synchronization function (TSF) with the controller.

6. The method of claim 5, wherein a TWT start time indicated in the allocation of the slot is referenced using a target beacon transmission time (TBTT) or an offset.

7. The method of claim 1, further comprising:
receiving a configuration from the controller assigning a channel on which to operate so that the plurality of STAs contend for the access to the medium on the channel during the slot.

8. A method, comprising:
receiving information of total target wakeup time (TWT) durations from a plurality of agents, each of the total TWT durations being collated by a respective agent of the plurality of agents based on TWT durations requested by a respective plurality of stations (STAs) connected to the respective agent;
allocating a plurality of slots to the plurality of agents based on the received information; and
transmitting an allocation of a respective slot of the plurality of slots to each agent of the plurality of agents such that each agent causes its respective plurality of STAs to contend for access to a medium during the respective slot.

9. The method of claim 8, wherein the respective plurality of STAs are kept in a wakeup mode during the respective slot such that the respective plurality of STAs contend for the access to the medium for a duration of the slot.

10. The method of claim 8, wherein the respective plurality of STAs are waken up one at a time such that each STA of the respective plurality of STAs contends for the access to the medium during a respective portion of the respective slot.

11. The method of claim 10, wherein each STA of the respective plurality of STAs is assigned the respective portion of the respective slot corresponding to a respective TWT duration requested by that STA.

12. The method of claim 8, further comprising:
synchronizing a timing synchronization function (TSF) with the plurality of agents.

13. The method of claim 12, wherein a TWT start time indicated in the allocation is referenced using a target beacon transmission time (TBTT) or an offset.

14. The method of claim 8, further comprising:
transmitting a configuration to each agent of the plurality of agents to assign a channel on which the plurality of agents operate so that the respective plurality of STAs of each agent contend for the access to the medium on the channel during the respective slot.

15. An apparatus, comprising:
a transceiver configured to communicate wirelessly; and
a processor coupled to the transceiver and configured to perform operations comprising:
collating, via the transceiver, target wakeup time (TWT) durations requested by a plurality of stations (STAs) to generate a total TWT duration;
transmitting, via the transceiver, information of the total TWT duration to a controller;
receiving, via the transceiver, an allocation of a slot from the controller responsive to the transmitting; and
causing, via the transceiver, the plurality of STAs to contend for access to a medium during the slot.

16. The apparatus of claim 15, wherein, in causing the plurality of STAs to contend for the access to the medium during the slot, the processor is configured to keep the plurality of STAs in a wakeup mode during the slot such that the plurality of STAs contend for the access to the medium for a duration of the slot.

17. The apparatus of claim 15, wherein, in causing the plurality of STAs to contend for the access to the medium during the slot, the processor is configured to wake up each STA of the plurality of STAs one at a time such that each of the STAs contends for the access to the medium during a respective portion of the slot.

18. The apparatus of claim 17, wherein, in waking up each STA of the plurality of STAs one at a time, the processor is configured to distribute a respective portion of the slot to each STA corresponding to a respective TWT duration requested by that STA.

19. The apparatus of claim 15, wherein the processor is further configured to synchronize a timing synchronization function (TSF) with the controller, and wherein a TWT start time indicated in the allocation of the slot is referenced using a target beacon transmission time (TBTT) or an offset.

20. The apparatus of claim 15, wherein the processor is further configured to receive, via the transceiver, a configuration from the controller assigning a channel on which to operate so that the plurality of STAs contend for the access to the medium on the channel during the slot.

* * * * *